Patented May 30, 1933

1,911,798

UNITED STATES PATENT OFFICE

HYYM E. BUC, OF ROSELLE, NEW JERSEY, ASSIGNOR TO STANDARD OIL DEVELOPMENT COMPANY, A CORPORATION OF DELAWARE

PROCESS OF PURIFYING HIGHER ALCOHOLS

No Drawing.   Application filed November 17, 1928. Serial No. 320,217.

This invention relates to improvements in the purification of higher alcohols, more particularly isopropyl alcohol (secondary propyl alcohol, $CH_3CH(OH)CH_3$) produced from petroleum hydrocarbons. I have discovered that such alcohol ordinarily contains appreciable amounts of tertiary butyl alcohol (trimethyl carbinol, $(CH_3)_3C.OH$). Higher tertiary alcohols may also be present, generally in smaller amounts. For many technical purposes the presence of the tertiary alcohols is of little consequence. However, it is highly important to remove such impurities from isopropyl alcohol when it is to be used as the source of propylene for anesthetic purposes. The decomposition products of the tertiary alcohols referred to have an adverse physiological effect in anesthesia.

The present invention comprises the elimination of tertiary alcohols and analogous impurities, preferably by means of an acid of high boiling point. I have found that the decomposition rate of tertiary alcohols is sufficiently rapid to permit their removal without excessive decomposition of the isopropyl alcohol.

The following example is illustrative of one embodiment of my invention: To 1000 parts by volume of isopropyl alcohol, containing about 3% of tertiary butyl alcohol, are added 200 parts by volume of aqueous sulfuric acid. The acid solution is preferably made up by diluting concentrated acid (about 1.84 specific gravity) with an equal volume of water. The mixture of acid and isopropyl alcohol is heated under a reflux condenser to a boiling temperature, preferably on a water bath, for about 48 hours. After this period of heating with return of reflux, test of the mixture shows only traces of tertiary alcohols, generally not more than 0.05%. When a higher degree of purity is desired, the heating is continued for about 24 hours more. This suffices to remove substantially all the tertiary alcohols.

Some isopropyl alcohol is lost in the form of propylene during the purification, but this loss does not exceed 10% when the treatment is properly conducted. The isopropyl alcohol may be readily separated from the acid by fractionation, without material decomposition of the alcohol. It is desirable to add some water to reduce the concentration of the acid.

The isopropyl alcohol may be tested for tertiary butyl alcohol and analogous compounds by the following sensitive reaction (cf. Deniges, Compt. Rend. 126, 1147): About 10 cc. of an aqueous solution containing 20 grams of mercuric sulfate and 50 cc. of concentrated sulfuric acid per litre are added to about 0.2 cc. of the alcohol, and the mixture is heated on a water bath for 20 to 30 minutes. A yellow precipitate indicates the presence of tertiary alcohols. Even a few hundredths of 1% of tertiary alcohol will impart a sufficient yellow coloration to make the precipitate readily distinguishable from the white or very slightly yellowish precipitate formed when the isopropyl alcohol is free from the tertiary compounds.

Instead of sulfuric acid, I may use phosphoric acid or any other reagent of relatively low volatility that is capable of preferentially decomposing tertiary alcohols present in isopropyl alcohol or other alcoholic liquids.

The proportion and concentration of acid, and the time and temperature of heating may also be varied rather widely. In general it is undesirable to have a high acid concentration. From 10 to 20% by volume of concentrated sulfuric or equivalent acid gives good results. The purification is more rapid with higher acid concentrations, but the losses of isopropyl alcohol are greater. Condensation reactions may also occur in the presence of concentrated acid.

I claim:

1. Process of removing tertiary alcohols and the like from admixture with a less readily decomposable alcoholic liquid, comprising heating such liquid with a mineral acid of relatively low volatility, diluted with not more than an equal volume of water, and capable of preferentially decomposing tertiary alcohols, refluxing undecomposed compounds, and taking off decomposition products of the tertiary alcohols.

2. Process of removing tertiary butyl alcohol and the like from isopropyl alcohol containing the same, comprising heating the isopropyl alcohol with sulfuric acid concentrated enough to decompose the tertiary butyl alcohol, under a reflux condenser to a boiling temperature for an extended period, whereby the tertiary butyl alcohol is decomposed and expelled.

3. Process of removing tertiary butyl alcohol from isopropyl alcohol containing the same, comprising heating the isopropyl alcohol with about 10 to 20% by volume of concentrated sulfuric acid and water not more than equal to the volume of concentrated sulfuric acid, with return of reflux for a period of at least 48 hours, whereby the tertiary butyl alcohol is decomposed and expelled.

4. Process according to claim 2, with the further step of adding water to the mixture of isopropyl alcohol and sulfuric acid and distilling off the isopropyl alcohol.

5. Process of removing tertiary butyl alcohol and the like from isopropyl alcohol containing the same, comprising refluxing the isopropyl alcohol in the presence of 10 to 20% by volume of a concentrated mineral acid of relatively low volatility, and water not more than equal to the volume of acid.

6. Process of removing tertiary butyl alcohol and the like from isopropyl alcohol containing the same, comprising refluxing the isopropyl alcohol in the presence of a small amount of aqueous sulfuric acid comprising approximately equal volumes of concentrated sulfuric acid and water whereby the tertiary butyl alcohol is decomposed and expelled.

7. Process according to claim 6 in which the refluxing is continued until the tertiary butyl alcohol content has been reduced generally to not more than 0.05%.

8. Process of removing tertiary butyl alcohol from isopropyl alcohol containing the same, without excessive decomposition of the isopropyl alcohol, comprising refluxing the isopropyl alcohol for an extended period in the presence of a small amount of aqueous sulfuric acid comprising approximately equal volumes of concentrated sulfuric acid and water.

HYYM E. BUC.